United States Patent

[11] 3,575,088

[72] Inventor Richard J. Bauer
 Davison, Mich.
[21] Appl. No. 042,759
[22] Filed June 2, 1970
 Division of Ser. No. 756,679, Aug. 30, 1968,
 Pat. No. 3,545,070.
[45] Patented Apr. 13, 1971
[73] Assignee General Motors Corporation
 Detroit, Mich.

[54] VACUUM MODULATOR
 2 Claims, 3 Drawing Figs.
[52] U.S. Cl. .................................................. 92/98,
 73/278
[51] Int. Cl. ............................................ F01b 19/00
[50] Field of Search ......................................... 92/98, 99,
 100, 101, 98 (RD); 74/18.1, 18.2; 73/278, 205,
 (Inquired)

[56] References Cited
 UNITED STATES PATENTS
 2,032,715 3/1936 Powell et al. ................. 92/98X
 2,045,861 6/1936 Kuskin ......................... 92/100X
 3,180,235 4/1965 Scmitz ......................... 92/101X
 3,183,788 5/1965 Olsson ......................... 92/99X
 3,377,922 4/1968 Spender et al. ............... 92/100X

*Primary Examiner*—Martin P. Schwadron
*Assistant Examiner*—Leslie J. Payne
*Attorneys*—W. E. Finken, A. M. Heiter and R. L. Phillips ABSTRACT: A vacuum modulator for an automotive automatic transmission control system is shown as having a subassembly including a diaphragm separating an atmospheric chamber from a vacuum chamber to which engine vacuum is applied for automatic transmission control purposes. Two stiff members sandwich the diaphragm in the subassembly, the member on the engine vacuum side serving as a seat for a spring providing the modulator's spring bias. The other member is on the atmospheric pressure side and has a socket receiving a control rod which is for transmitting the modulator's output force to a modulator valve in the transmission control system. The vacuum side member has a sleeve portion which extends through an aperture in the diaphragm and into an annular channel in the atmospheric pressure side member so that the sleeve portion is positioned between the channel's inner and outer wall. The outer channel wall is staked to the sleeve portion to provide mechanical connection in the subassembly. Apparatus is also shown for the staking operation which in cooperation with a radial section of the sleeve portion engaging the channel prevents crushing of the socket during the staking operation.

Patented April 13, 1971 3,575,088

INVENTOR.
Richard J. Bauer
BY
Ronald L. Phillips
ATTORNEY

VACUUM MODULATOR

This is a division of Ser. No. 756,679 filed Aug. 30, 1968, now U.S. Pat. No. 3,545,070.

This invention relates to vacuum modulators and more particularly to mechanically connected diaphragm assemblies and method of assembly therefor.

In devices such as vacuum modulators wherein a subassembly including a diaphragm is employed as a gas barrier, the diaphragm is generally made of fabric coated with rubber which permits the stiff members of the subassembly to be cemented or vulcanized to the diaphragm. Attempts have been made to increase the flex life of the diaphragm by coating the diaphragm fabric on each side with a commercially available gas-impervious material having a longer flex life such as commercially available fluorosilicone elastomer but such a material is not readily cemented or vulcanized resulting in the need for different means of connection. I have discovered a simple mechanical connection for such a subassembly which provides a long and circuitous possible leak path to prohibit gas leakage as compared with structures where securing means such as rivets are received in aligned holes extending completely through the diaphragm subassembly.

The vacuum modulator according to the present invention may be employed in a transmission control system such as shown in Van Lent et al. U.S. Pat. No. 3,308,677 to act on a modulator valve for pressure modulation in accordance with engine vacuum, such pressure being used for controlling shift valve operation, line pressure regulation and other functions in the transmission control system, such type of control being well known in the automatic transmission control art. The vacuum modulator comprises a subassembly including a diaphragm separating a housing into two chambers, one chamber being open to the atmosphere and the other chamber for connection to the engine's intake manifold. The diaphragm in the subassembly is made of fabric which is coated on each side with a gas-impervious material having long flex life. The diaphragm is sandwiched between two stiff members, one member having an annular channel and a central socket which receives a force output rod and the other member which serves as a spring seat having a central sleeve portion which extends through a central aperture in the diaphragm and into the annular channel in the former member. For assembling the subassembly, an annular staking anvil is positioned between the sleeve portion and the inner channel wall of the stiff members while they are forced together to clamp the diaphragm therebetween. The end of the sleeve portion is fitted to the bottom of the channel so that it, together with the staking anvil, provides radial support to prevent crushing of the socket while the outer channel wall is staked to the sleeve portion to connect the subassembly.

An object of the present invention is to provide a new and improved diaphragm assembly.

Another object is to provide a new and improved vacuum modulator for an automatic transmission control system.

Another object is to provide a diaphragm assembly having a simple mechanical connection providing a long and circuitous possible leak path.

Another object is to provide a diaphragm assembly having a diaphragm sandwiched between two stiff members with one member having a socket for force transmittal and the members secured by a connection outward of the socket provided by a staking operation wherein the crushing of the socket is prevented.

Another object is to provide a gas-impervious diaphragm assembly with a single aperture through the diaphragm for mechanical connection of the stiff members of the assembly by a staking operation on portions of the stiff members with crushing of a socket provided in one of the members prevented during the staking.

These and other objects of the invention will be more apparent from the following description and drawing in which.

Figure 1:
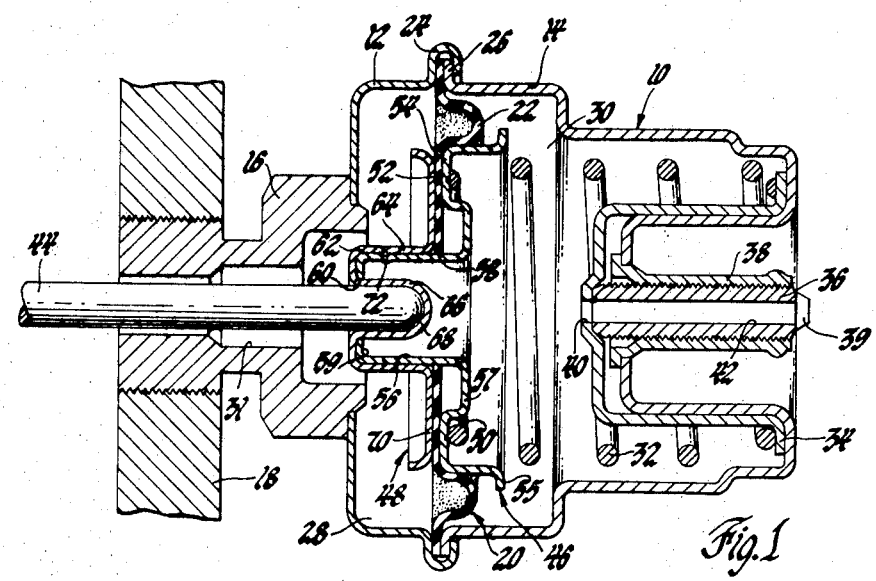
FIG. 1 is a longitudinal sectional view through a vacuum modulator according to the present invention.

Referring to FIG. 1, the vacuum modulator generally indicated by the numeral 10 is for controlling a modulator valve in an automotive automatic transmission control system such as shown in detail in the Van Lent et al. U.S. Pat. No. 3,308,677. Therefore, details of the transmission control system including the modulator valve and its operation need not be discussed in detail here, it being sufficient to know that the vacuum form the engine's intake manifold is applied to the vacuum modulator to provide an output modulator force which varies with engine manifold vacuum and thus engine torque demand. The vacuum modulator comprises a housing formed in two parts, one part being a cup-shaped base member 12 and the other part being a cup-shaped cap member 14. Base member 12 is brazed to collar 16 which is screwed to a support 18 such as the transmission housing that houses the transmission control system.

A diaphragm assembly 20 comprises a diaphragm 22 which at its outer perimeter is sandwiched between a flange 24 provided on base member 12 and an opposed flange 26 formed on cap member 14, flange 24 being crimped over flange 26 to provide connection of these parts and a tight seal. The diaphragm assembly 20 separates the housing interior into two chambers, namely an atmospheric pressure chamber 28 and a vacuum chamber 30, the chamber 28 being open to the atmosphere which exists in the transmission housing 18 via central passage 31 through collar 16. A spring 32 located in the vacuum chamber 30 is arranged between the diaphragm assembly 20 and an adjustable spring seat 34, the position of the spring seat 34 being determined by a calibrating screw 36. The screw 36 is screwed to the interior of a nipple 38 brazed to the right end of cap 14 at a central position. The screw 36 extends into the vacuum chamber 30 to contact at one end with the center of spring seat 34. Screw 36 has a screwdriver slot 39 at the other end for receiving a screwdriver so that it can be advanced or retracted for fine adjustment of the spring-biasing force which acts to urge or push the diaphragm assembly 20 leftward. The spring seat 34 and calibrating screw 36 have central passages 40 and 42, respectively, which are aligned to provide a passage for connecting the vacuum chamber 30 to the engine intake manifold by a hose which fits the nipple 38, the screwdriver slot 39 being closed from view by the fitting of the hose on nipple 38.

Thus, it can be seen that the spring force is opposed by engine vacuum in the vacuum chamber 30 creating a differential pressure urging the diaphragm assembly rightward. The effective output force of the modulator 10 is transmitted from the diaphragm assembly 20 by a force-transmitting rod 44 which extends freely through passage 31 to engage the transmission control system's modulator valve inside the transmission housing 18.

Referring now to the details of the diaphragm assembly 20, the diaphragm 22 is preferably made of cloth fabric which is coated on both sides with commercially available fluorosilicone elastomer which is gas-impervious and has long flex life. The diaphragm 22 is sandwiched between a vacuum side member or piston 46 and an atmospheric pressure side member or piston 48, both these members being made of a stiff material which is preferably metal. Vacuum side member 46 has an annular channel 50 having an annular sealing rib 52 on what is otherwise a flat annular section 54 at right angles to the member's central axis. Vacuum side member 46 also has an outer flange 55 and a central axially extending sleeve portion 56 projecting from an annular flat section 57. The sleeve portion 56 extends through and has a close fit in a central circular aperture 58 in diaphragm 22. The sleeve portion 56 has a radial end section 59 with a central circular aperture 60 whose edge is chamfered for reasons which will become more apparent later in the description.

The atmospheric pressure side member 48 has a central, axially extending annular channel 62 whose outer wall 64 closely fits the outer surface of the sleeve portion 56 of the vacuum side member 46. The channel's inner wall 66 extends through and has a close fit with the chamfered aperture 60 in the sleeve portion 56 of the vacuum side member 46. The inner wall 66 is continuous and provides a socket 68 which receives the rounded end of control rod 44, the rod and socket having a close fit. The member 48 is also provided with a flat annular section opposite the flat section 54 of member 46 and the members 46 and 48 are pressed together so that the sealing rib 52 depresses the diaphragm 22 to provide a tight annular seal. With the members 46 and 48 and intermediately located diaphragm 22 thus clamped, the members 46 and 48 are held together by staking the outer channel wall 64 of member 48 to sleeve portion 56 of member 46. Three equally circumferentially spaced stakes are sufficient, only one of which is shown and indicated as 72. With this arrangement, there is only a single aperture in the diaphragm 22 and any gas leakage would have to be past the rib seal, between the diaphragm 22 and sleeve portion 56 and finally between the chamfered opening 60 and the inner wall 66 of channel 62.

Figure 2:
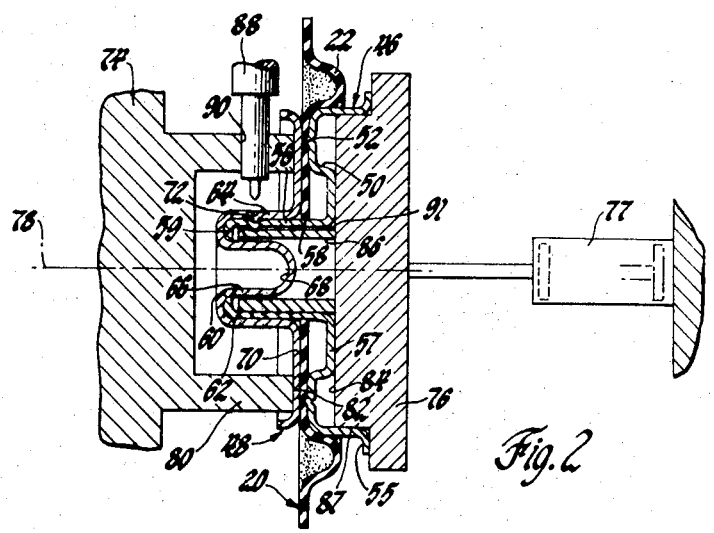
FIG. 2 is a longitudinal view of apparatus for assembling the diaphragm assembly.

Referring to FIG. 2, apparatus for assembling the diaphragm assembly 20 comprises a stationary fixture 74 and a movable head 76 which is advanced and retracted relative to the stationary fixture 74 by any suitable means such as a conventional pneumatic cylinder 77 having either an automatic or manual control, such movement being along an axis 78. The stationary fixture 74 has a cylindrical portion 80 having an annular end face 82 centered on axis 78, the face 82 being sized for engagement by the flat section 70 of member 48 and opposite the rib 52 on member 46 as shown. The movable head 76 has a circular end face 84 which is centered on axis 78 and sized to engage the flat section 57 of member 46 as shown. A cylindrical staking anvil 86 is welded to the end face 84 of the movable head 76 so that it is centered on axis 78 and has a wall thickness permitting it to be moved to the location shown between the sleeve portion 56 of member 46 and the inner channel wall 66 of member 48.

According to my method of assembling the diaphragm assembly 20 which is a subassembly of the modulator 10, the head 76 is moved to the right to a retracted position by cylinder 77. While in the retracted head position, the vacuum side member 46 is positioned on the head 76 so that its central axis coincides with the axis 78 of the assembly apparatus with the sleeve portion 56 fitting over the anvil 86, such location being assured by flange 55 of member 46 fitting on an annular step 87 provided on head 76 with the flange's right side contacting the shoulder of the step. Next, the diaphragm 22 is mounted on the vacuum side member 46 with the sleeve portion 56 closely fitting in the aperture 58 of the diaphragm 22, the proper location of diaphragm 22 thus being assured. Then, the atmospheric pressure side member 48 is mounted with its outer channel wall 64 fitting the sleeve portion 56 of member 46 with proper location of the member 48 thus assured.

Figure 3:
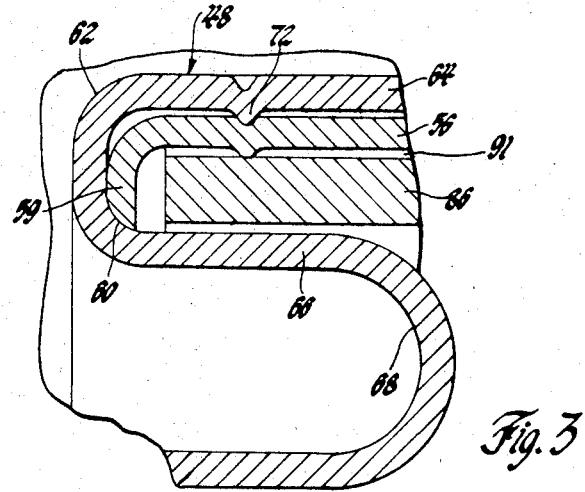
FIG. 3 is an enlarged view of a portion of FIG. 2.

With the diaphragm assembly 20 nonpermanently assembled on the retracted head 76, cylinder 77 is operated to advance the head 76 leftward to engage the flat section 70 of member 48 with the end face 82 of the stationary fixture 74, the head 76 engaging both the flat section 57 and the right side of flange 55 on member 46. This advancement is continued until the members 46 and 48 of the assembly are pressed together sufficiently to impress the sealing rib 52 in the diaphragm 22 and position the chamfered edge of aperture 60 on sleeve portion 56 against the curvature of the inner channel wall 66 at the bottom of channel 62 as best shown in FIG. 3. While the members 46 and 48 and the intermediate diaphragm 22 are thus clamped by the apparatus, the members 46 and 48 are staked together.

Staking is accomplished by a staking pin 88 which is guided in a radial bore 90 extending through the cylindrical portion 80 of the stationary fixture 74. The staking pin 88 is give a sharp blow such as by a hammer to stake the outer channel wall 64 to the sleeve portion 56. The staking anvil 86 by its close fit with the interior of sleeve portion 56 provides support for the staking operation to maintain the shape of the walls being staked, the anvil 86 having a longitudinal groove 91 in its external surface for receiving the staked projection of sleeve portion 56. The radial section 59 of the sleeve portion 56 by its positioning at the bottom of channel 62 cooperates with the staking anvil 86 to prevent the socket 68 from being collapsed during the staking operation, the radial end section 59 providing radial support for the sleeve portion 56 and the outer channel wall 64. The members are preferably staked at three points which are equally, circumferentially spaced, i.e. 120° apart, and for this purpose there are provided two other guide bores, not shown, like bore 90 for two other staking operations using the staking pin 88 and a corresponding number of grooves in anvil 86 like groove 91 for receiving these staked projections. When the staking is completed, the head 76 is retracted to permit removal of the staked diaphragm assembly 20. Thus, with this method of assembly, the socket 68 is prevented from being collapsed by the staking operation which collapsing, if permitted to occur, would prevent reception of the close-fitting, force-transmitting load 44.

The above-described preferred embodiment is illustrative of the invention and may be modified within the scope of the appended claims.

I claim:

1. A vacuum modulator comprising a housing whose interior is separated into an atmospheric pressure chamber and a vacuum chamber by a diaphragm assembly, said diaphragm assembly having two members sandwiching a diaphragm whose perimeter is sealingly secured to said housing, one of said members having an annular channel with an inner and outer wall, said inner wall providing a centrally located socket on the atmospheric pressure chamber side of said diaphragm assembly, a force-transmitting rod having a rounded end received in said socket, said rod extending through said atmospheric pressure chamber and an aperture in said housing, the other of said members having a central projecting sleeve portion extending through a central aperture in said diaphragm and into said channel, said sleeve portion having a radial end section engaging the inner wall's curvature at the bottom of said channel to provide radial support for said sleeve portion and said outer wall, said outer wall staked to said sleeve portion to hold said members and intermediate diaphragm pressed together, and a spring arranged between said other member and said housing to urge said diaphragm assembly to push on said rod.

2. A diaphragm assembly comprising a diaphragm arranged between two members, one of said members having an annular channel with an inner and outer wall, said inner wall providing a socket, the other of said members having a projecting sleeve portion extending through an aperture in said diaphragm and into said channel, said sleeve portion having a radial end section engaging the inner wall's curvature at the bottom of said channel to provide radial support for said sleeve portion and said outer wall, and said outer wall staked to said sleeve portion to hold said members and intermediate diaphragm pressed together.